US008759681B2

(12) United States Patent
Doi et al.

(10) Patent No.: US 8,759,681 B2
(45) Date of Patent: Jun. 24, 2014

(54) WIRE PROTECTIVE MEMBER

(75) Inventors: Masayuki Doi, Yokkaichi (JP); Toshitsugu Morii, Yokkaichi (JP); Arisa Imatoku, Yokkaichi (JP)

(73) Assignee: Sumitomo Wiring Systems, Ltd. (JP)

( * ) Notice: Subject to any disclaimer, the term of this patent is extended or adjusted under 35 U.S.C. 154(b) by 691 days.

(21) Appl. No.: 12/616,961

(22) Filed: Nov. 12, 2009

(65) Prior Publication Data
US 2010/0122835 A1 May 20, 2010

(30) Foreign Application Priority Data

Nov. 19, 2008 (JP) .................................. 2008-295538
Mar. 19, 2009 (JP) .................................. 2009-068783

(51) Int. Cl.
*H01B 7/00* (2006.01)
*H01B 7/08* (2006.01)

(52) U.S. Cl.
USPC .................... 174/117 A; 174/120 C; 174/135

(58) Field of Classification Search
CPC ... H02G 15/003; H02G 15/007; H02G 15/18; H02G 15/1806; H02G 15/1813; H02G 15/182; H02G 15/1826; H02G 15/1833; H02G 15/184; H02G 15/196; H02G 15/113; H02G 15/115; H01B 11/1834; H01B 11/1839; H01B 11/1852; H01B 11/1847; H01R 13/465; H01R 13/50; B29C 61/0633; B29C 61/065
USPC .............. 174/72 A, 73.1, 102 SP, 117 A, 36, 174/120 C, 111, 112, 135
See application file for complete search history.

(56) References Cited

U.S. PATENT DOCUMENTS 2,583,026 A * 1/1952 Swift ........................ 174/117 R
3,239,916 A * 3/1966 Lee ............................ 174/117 A
(Continued)

FOREIGN PATENT DOCUMENTS

DE 29823462 U1 7/1999
EP 1911824 A1 4/2008
JP 2000-353432 12/2000

OTHER PUBLICATIONS

Attached CA2309857 is used as an English Translation of Applicant Provided DE/29823462.*

(Continued)

*Primary Examiner* — Chau N Nguyen
*Assistant Examiner* — Roshn Varghese
(74) *Attorney, Agent, or Firm* — Gerald E. Hespos; Michael J. Porco; Matthew T. Hespos

(57) ABSTRACT

A wire protective member (10) is provided for covering a wire (11) from an outer side. The wire protective member (10) has a first base (13) includes a first adhesive layer (12) to be bonded to the wire (11) on one surface thereof, a second base (16) to be placed on a surface of the first base (13) opposite to the one including the first adhesive layer (12), and spacers (14) formed between the first and second bases (13, 16). No clearance is formed between the wire (11) and the protective member (10) to achieve a space saving. Further, since it is sufficient to wrap the wire (11) with one member composed of the first adhesive layer (12), the first base (13), the layer partly formed with the spacers (14) and the second base (16), time and effort for a mounting operation and the number of parts can be reduced.

8 Claims, 15 Drawing Sheets

(56) References Cited

U.S. PATENT DOCUMENTS

| | | | | |
|---|---|---|---|---|
| 3,457,919 | A | * | 7/1969 | Harbard ........................ 428/131 |
| 3,881,041 | A | * | 4/1975 | Glienke ........................ 428/41.7 |
| 3,900,027 | A | * | 8/1975 | Keedwell ........................ 604/307 |
| 4,045,607 | A | * | 8/1977 | Swearingen et al. ... 174/117 FF |
| 4,460,804 | A | * | 7/1984 | Svejkovsky ............... 174/117 A |
| 4,596,897 | A | * | 6/1986 | Gruhn ............................. 174/36 |
| 4,731,500 | A | * | 3/1988 | Otsuka ............................ 174/36 |
| 4,746,767 | A | * | 5/1988 | Gruhn ............................. 174/36 |
| 4,767,673 | A | * | 8/1988 | Nakano et al. ................ 428/458 |
| 4,980,223 | A | * | 12/1990 | Nakano et al. ................ 174/36 |
| 5,616,387 | A | | 4/1997 | Augst et al. |
| 7,674,981 | B1 | * | 3/2010 | Hesselbarth et al. ..... 174/110 R |
| 2004/0062497 | A1 | * | 4/2004 | Plemmons et al. ........... 385/109 |
| 2004/0082243 | A1 | * | 4/2004 | Kulper .......................... 428/343 |
| 2006/0151656 | A1 | * | 7/2006 | Gallagher et al. ............ 242/437 |
| 2007/0237936 | A1 | | 10/2007 | Kulper et al. |
| 2010/0236827 | A1 | * | 9/2010 | Doi et al. .................... 174/72 A |

OTHER PUBLICATIONS

English Machine Translation of Frigge (EP 1911824) provided with Office Action.*

* cited by examiner

| | ABRASION RESISTANCE (cm) |
|---|---|
| 0.3t PP FILM FLAME RESISTANT CORRUGATE TUBE SUPPOSED | 100 TO 200 |
| FIRST PROTECTION TAPE 20 | 100 TO 200 |
| SECOND PROTECTION TAPE 40 | 100 TO 200 |

WIRE PROTECTIVE MEMBER

BACKGROUND OF THE INVENTION

1. Field of the Invention

The invention relates to a wire protective member.

2. Description of the Related Art

Japanese Unexamined Patent Publication No. 2000-353432 discloses at least one wire laid in an automotive vehicle or the like with a corrugated tube as an external protective member to protect the wire from friction with members near the wire. The wire is inserted through a longitudinal slit in the corrugated tube. A tape is wrapped around the wire to facilitate insertion into the corrugated tube and to protect the wire from friction with the inner wall of the corrugated tube. Tape then is wrapped around the corrugated tube to prevent the slit from opening, for example, when the corrugated tube is bent.

Accordingly, production of a wire in a corrugated tube requires: wrapping tape around the wire; inserting the wire into the corrugated tube; and winding a tape to prevent the corrugated tube from opening. This production is expensive due to required time and effort and a large number of parts.

A take-up rate of the wire in the corrugated tube is restricted to prevent the wire from coming out of the corrugated tube. However, a space is present between the wire and the corrugated tube and the restriction on the take-up rate of the wire is a hindrance to space saving.

Members arranged around the wire include a member formed by bending a metal base plate having a developed shape of the member. The base plate is obtained by punching out the metal plate or cutting the metal plate using a cutting tool. A base plate formed with a cutting tool has a cutting cross section extended in a cutting direction due to metal ductility and small burrs may be formed in a relative wide area. A base plate formed by punching out the metal plate may have long narrow projecting burrs. These burrs may contact and abrade the wire protective member.

The prevent invention was developed in view of the above situation and an object thereof is to provide a wire protective member and a covering method which requires reduced time and effort for a mounting operation on a wire and a reduced number of parts, is space saving and has improved abrasion resistance.

SUMMARY OF THE INVENTION

The invention relates to a wire protective member for at least partly covering a wire from an outer side. The wire protective member has a first base with a first adhesive layer to be bonded to one surface of the wire, a second base to be placed on a surface of the first base opposite to the surface with the first adhesive layer, and one or more spacers formed in parts of a clearance between the first and second bases. The protective member is bonded and fixed to the wire via the adhesive layer. Thus, no clearance is formed between the wire and the protective member and space is saved. Further, it is sufficient to wrap the wire with one member composed of four layers, i.e. the adhesive layer, the first base, a spacer layer formed with the spacers and the second base. Thus, time and effort for a mounting operation on the wire and the number of parts can be reduced.

As described above, members arranged around the wire may be formed with small burrs in a relatively wide area or long narrow projecting burrs may be formed when the members are punched out. Thus, abrasion may be caused by contact of these burrs and the wire protective member. However, the above-described protective member has the four-layer structure and an appropriate thickness. Therefore, long narrow projecting burrs that contact the protective member are not likely to reach the wire inside. Further, the spacers of the spacer layer of the protective member form voids between the spacers. Hence, burrs formed in a relatively wide area come will cause the second base member to deform resiliently and escape into the voids. As a result, abrasion resistance can be improved.

The spacers may be formed by partly applying an adhesive to parts of the surface of the first base opposite to the surface with the first adhesive layer. The second base then is bonded to the partly applied adhesive. Therefore the protective member of the invention can be formed easily.

At least one of the first and second bases may be formed with cutting or separation lines. Accordingly, the protective member easily can be hand-cut even if the thickness of the entire protective member is large.

The sum of the thicknesses of the first and second bases may be substantially equal to or smaller than 1.0 mm. Accordingly, the protective member can be hand-cut easily. It should be noted that the thickness of the first base does not include thicknesses of the adhesive layer and the spacers and the thickness of the second base does not include the thickness of the spacers.

The wire protective member may be a substantially rectangular sheet with the length of the longer sides thereof related to the length of the wire and the length of the shorter sides related to the outer circumference of the wire. Accordingly, the protective member may be wrapped once around the outer circumferential surface of the wire with a longer side direction of the substantially rectangular protective member aligned parallel with a longitudinal direction of the wire. Therefore, the mounting operation is easy.

The wire protective member may be a laminated or composite base formed by bonding two fabric materials made of a knitted fabric and/or a woven fabric using glue and/or adhesive, and an adhesive layer formed on the underside of the base. An external load applied to the tape-like protective member is distributed mainly in the two fabric materials to relax a stress. Therefore the base has good abrasion resistance. Additionally, the three-layer protective member can be wrapped around a wire bundle and provides good abrasion resistance protection to the wire bundle.

The ability to hand-cut the protective member easily enables the protective member to be mounted be efficiently. Thus, the time required for mounting the protective member can be shortened, the number of parts can be reduced, and production costs can be reduced drastically.

The tape merely is wrapped. Thus, the diameter of a wiring harness is suppressed to a minimum, which can contribute to space and weight saving.

The glue and/or the adhesive for bonding the two fabric materials of the base member may be applied in dots to form clearances between the two fabric materials. Thus, the fabrics display a better load distribution function. Further, the protective member has good sound deadening qualities and the generation of noise is suppressed when a wiring harness contacts or abrades against a surrounding member due to vibration or the like. Further, the protective member has good flexibility and can be wrapped more closely around the outer circumferential surface of the wire bundle even if the outer circumferential surface of the wire bundle is uneven or the wire bundle is bent.

The wire protective member may comprise a laminated or composite base formed by bonding a fabric material made of a woven or knitted fabric and a sheet material via a rubber adhesive, and an adhesive layer formed on the underside of the base.

According to this construction, the tape-like protective member has the base member having a three-layer structure by bonding the fabric material made of the woven fabric or the knitted fabric and the other sheet member via the rubber adhesive and, in the case of being subjected to A stress caused by an external load is relaxed mainly in the rubber adhesive, which is an intermediate layer. Therefore the base member is difficult to abrade. At least the outer layer of the base is made of the woven or knitted fabric. Thus, the base can be hand-cut easily. Wrapping a wire bundle with this abrasion resistant protective protects the wire bundle sufficiently.

The protective member can be mounted merely by being wrapped around the outer circumferential surface of the wire bundle and can be hand cut easily. As a result, the time for the mounting operation can be shortened, the number of parts can be reduced and production costs can be reduced drastically.

These and other objects, features and advantages of the present invention will become more apparent upon reading of the following detailed description of preferred embodiments and accompanying drawings. It should be understood that even though embodiments are separately described, single features thereof may be combined to additional embodiments.

DETAILED DESCRIPTION OF THE PREFERRED EMBODIMENTS

A wire protective member in accordance with a first embodiment of the invention is identified generally by the numeral 10 in FIGS. 1 to 4. The protective member 10 is for protecting at least one wire 11 that has a core 11A covered by an insulation coating 11B and is used by covering the wire 11 from an outer side, as show in FIGS. 1 and 4.

The protective member 10 is a substantially rectangular sheet with a long side and a short side. The long side has a length that substantially corresponds to the length of the wire 11 and the short side has a length that substantially corresponds to the length of the outer circumference of the wire 11. The protective member 10 is to be bonded and fixed while being wrapped around the wire 11 with the long side aligned substantially parallel to a longitudinal direction of the wire 11 and the short side aligned substantially with the outer circumference of the wire 11 (see FIG. 4).

Figure 1:
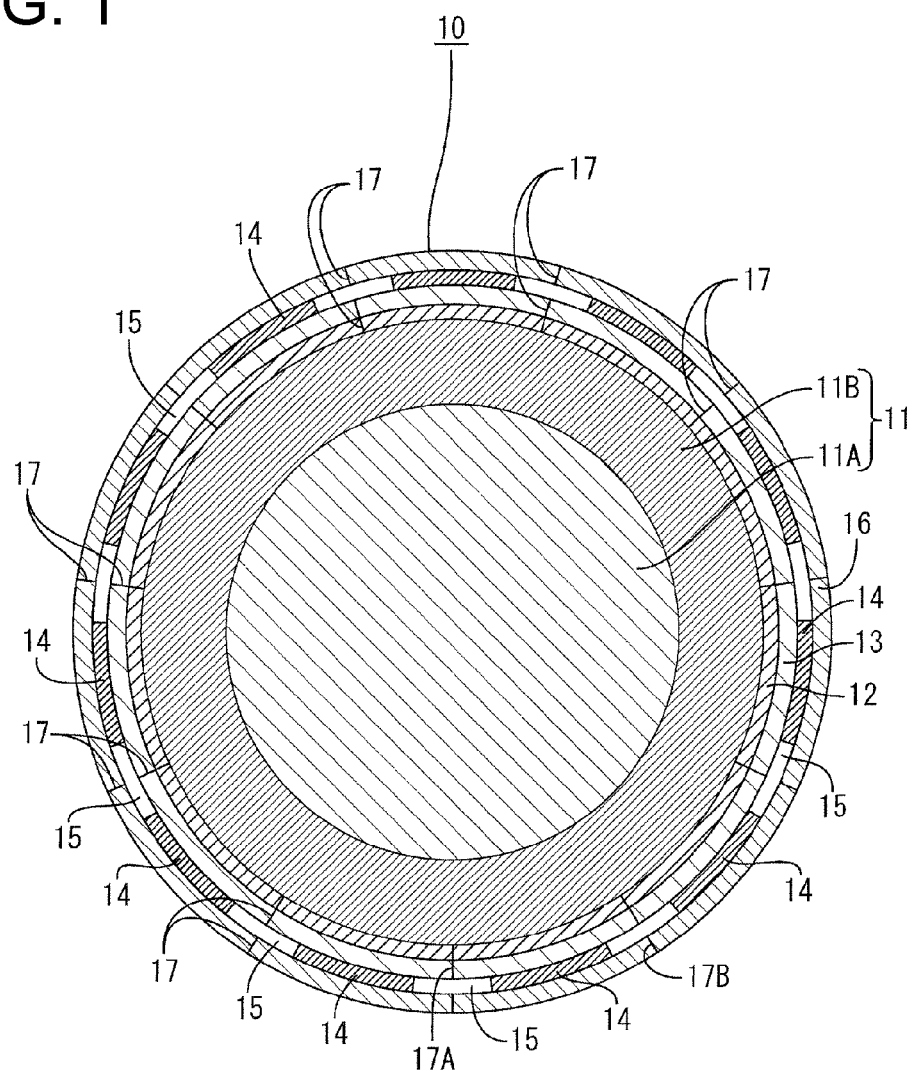
FIG. 1 is a section of a wire covered by a wire protective member according to a first embodiment.
Figure 2:
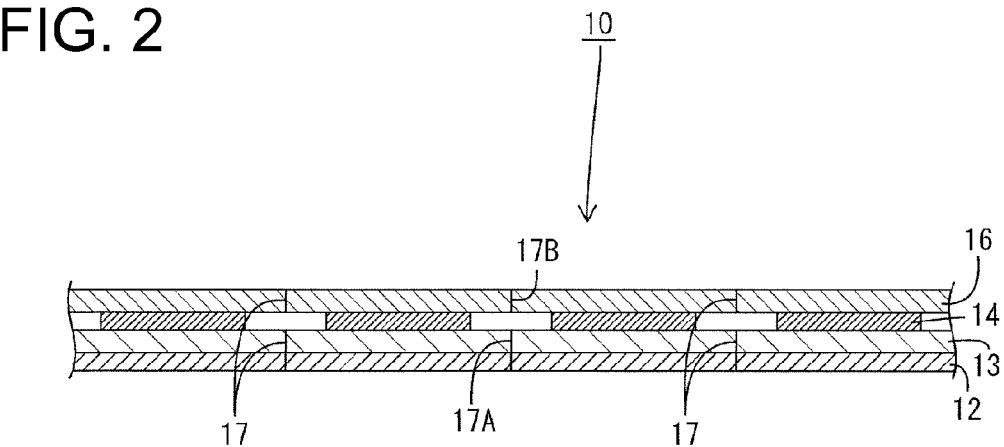
FIG. 2 is a section of the wire protective member.

As shown in FIGS. 1 and 2, the protective member 10 has a first adhesive layer 12 to be bonded to the wire 11, a first base 13, a spacer layer partly formed with spacers 14 and a second base 16 arranged one on top of each other in a radially direction.

The protective member 10 is formed with perforations 17 that define weakened portions extending substantially from the second base member 16 to the first adhesive layer 12 to be bonded to the wire 11 and easily separated or cut e.g. by hand. Specifically, the perforations 17 are formed in the protective member 10 to correspond to voids 15 where no spacers 14 are formed. The perforations 17A in FIGS. 1 and 2 are formed in the first base 13 and the perforations 17B are formed in the second base 16.

The sum of the thicknesses of the first and second bases 13 and 16 preferably is equal to or less than 1.0 mm so as to enable easy hand cutting or separation even in parts where no perforations 17 are formed.

The first base 13 preferably is a resin sheet, a metal foil, a paper, a nonwoven fabric and/or a woven fabric.

The first adhesive layer 12 to be bonded to the wire 11 preferably is formed entirely on a first surface of the first base 13, and the spaces 14 are formed at intervals on the second surface of the first base 13, as shown in FIG. 2.

The first adhesive layer 12 can be a known adhesive, such as a rubber adhesive, a polyurethane adhesive, an acrylic adhesive, a silicone adhesive and/or a polyether adhesive. The thickness of the first adhesive layer 12 is preferably equal to or larger than 0.1 mm and/or equal to or smaller than 0.5 mm.

Figure 3:
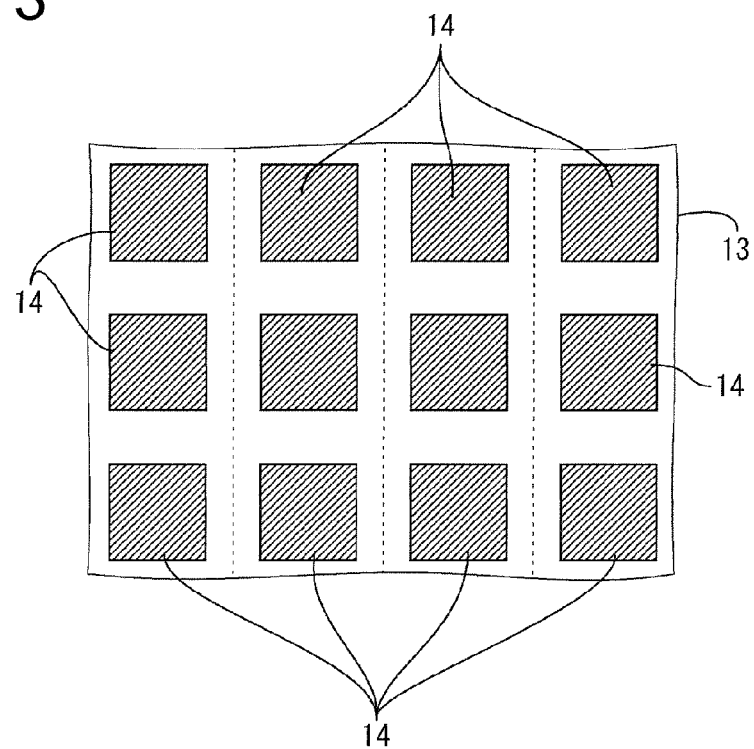
FIG. 3 is a plan view of a part of a first base formed with second adhesive portions.
Figure 4:
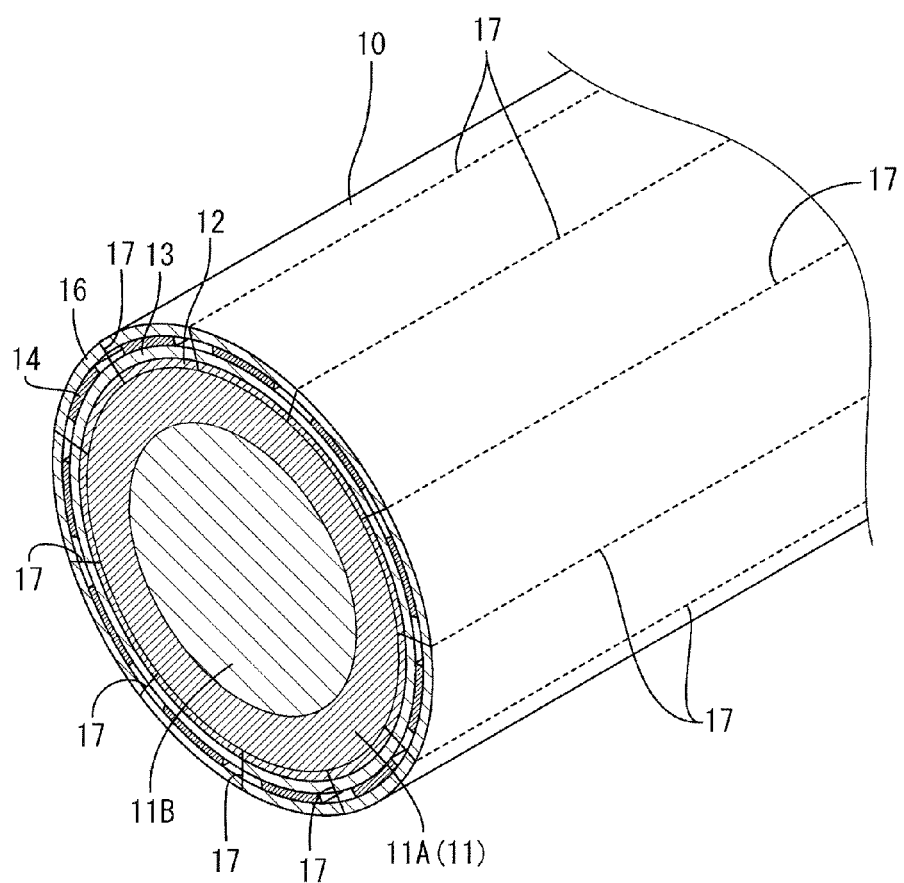
FIG. 4 is a perspective view of the wire covered by the wire protective member.

The spacers 14 preferably are substantially rectangular or square, as shown by shading in FIG. 3, and are formed by applying second adhesive portions to the second surface of the first base 13 and curing the second adhesive. The voids 15 are areas where no spacers 14 are formed.

The spacers 14 formed after curing the second adhesive preferably are approximately 10-20 mm×10-20 mm and preferably are 0.1-0.5 mm thick. An interval between adjacent spacers 14 preferably is about 2 mm to 5 mm.

The second adhesive for forming the spacers 14 may be the same as the adhesive for the first adhesive layer 12 and/or a UV-setting adhesive. However, the second adhesive preferably has a hardness so as not to be broken when the protective member 10 is wrapped around the wire 11. The second adhesive for forming the spacers 14 can be applied by a known method such as a method for printing an adhesive.

A second base 16 may be formed from a material similar to those cited for the first base 13. Preferably, the second base 16 is a nonwoven fabric or a woven fabric to provide a countermeasure against noise.

The protective member 10 can be produced, for example, by the following method.

A step of applying the first adhesive layer 12 to the first surface of the first base 13 and a step of applying the second adhesive for forming the spacers 14 to the second surface of the first base 12 preferably are performed in one line.

The second base 16 then is placed on and attached to the second adhesive portions 14 formed on the first base 13 and the second adhesive portions 14 are cured. The perforations 17 then are formed at specified positions to obtain the protective member 10 in the form of one sheet including the spacers 14 between the first and second bases 13, 16 and formed with the perforations 17.

The protective member 10 is fixed to the wire 11 via the first adhesive layer 12 so that no clearance is formed between the wire 11 and the protective member 10, thereby saving space. Further, it is sufficient to wrap one member around the wire 11, thereby saving time and effort for the mounting operation and reducing the number of parts.

Members arranged around the wire 11 may be formed with small burrs in a relatively wide area or narrow and long projecting burrs formed when the members are punched out. However, the protective member 10 has a four-layer structure comprised of the first adhesive layer 12, the first base 13, the layer formed with the spacers 14 and the second base 16 and has an appropriate thickness. Thus, long narrow projecting burrs that contact the protective member 10 are not likely to reach the wire 11 inside. Further, the second base 16 is resiliently deformed and escapes into the voids 15 even if burrs formed in a relatively wide area contact the protective member 10. As a result, abrasion resistance can be improved.

The spacers 14 are formed from the second adhesive portions by partly applying the adhesive to the radially outside surface of the first base 13, which is the surface of the first base 13 opposite to the surface that has the first adhesive layer 12, and the second base 16 is bonded to the second adhesive portions by being placed and adhered thereon. Thus, the second adhesive portions 14 for forming the spacers 14 also function to bond the first and second bases 13 and 16. Thus, the protective member 10 can be produced easily.

Further, the first and second bases 13, 16 are formed respectively with the perforations 17A, 17B and easily can be cut or separated by hand along the perforations 17A, 17B. Furthermore, the sum of the thicknesses of the first and second bases 13 and 16 preferably is no more than 1.0 mm. Thus, the protective member 10 easily can be cut or separated by hand even in parts where no perforations 17A, 17B are formed.

The protective member 10 preferably is a substantially rectangular sheet with a length related to the length of the wire 11 and a width related to the outer circumference of the wire 11. Thus, the substantially rectangular sheet-shaped protective member 10 can be bonded and fixed to the wire 11 merely by being wrapped along the outer circumference of the wire 11, and the mounting operation or processing can be performed easily.

A second embodiment of the invention is described with reference to FIG. 5. Elements that are substantially same or similar to the first embodiment are identified by the same reference numerals and not repeatedly described.

A protective member 10 of this embodiment differs from the first embodiment in being in the form of a tape having a narrower width than in the first embodiment and being formed with no perforations 17.

Figure 5:
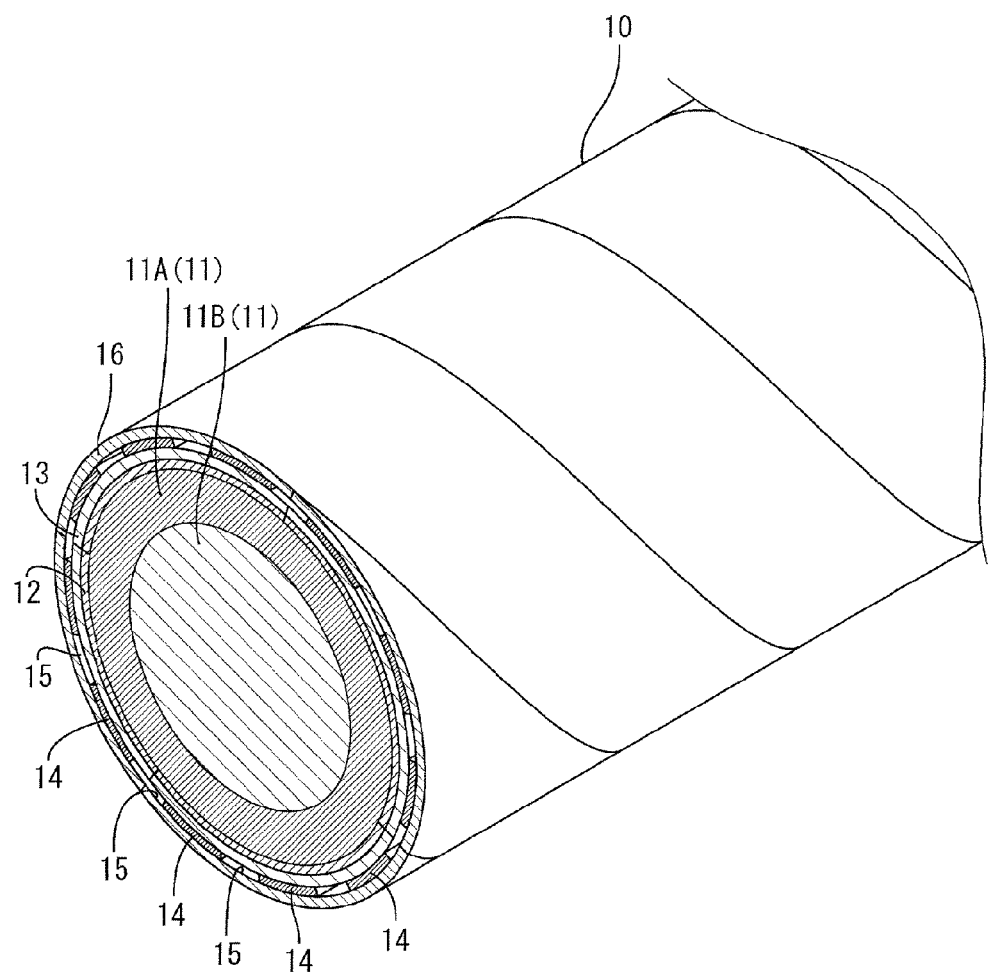
FIG. 5 is a perspective view of a wire covered by a wire protective member according to a second embodiment.

As shown in FIG. 5, the protective member 10 is bonded and fixed by being wrapped obliquely around the wire 11 with respect to a longitudinal direction of the wire 11 with a first adhesive layer 12 arranged at a side toward the wire 11.

The protective member 10 of the FIG. 5 embodiment is fixed to the wire 11 via the first adhesive layer 12 similar to the first embodiment. Thus, space saving is possible and it is sufficient to wrap and bond the protective member 10 around the wire 11. Therefore, time and effort for a mounting operation and the number of parts can be reduced.

The protective member 10 of FIG. 5 also has an appropriate thickness and is formed partly with spacers 14 to improve abrasion resistance in a manner similar to the first embodiment. Further, the spacers 14 are formed by second adhesive portions 14 that also function to bond first and second base members 13 and 16. Therefore the protective member 10 can be produced easily.

Figure 6:
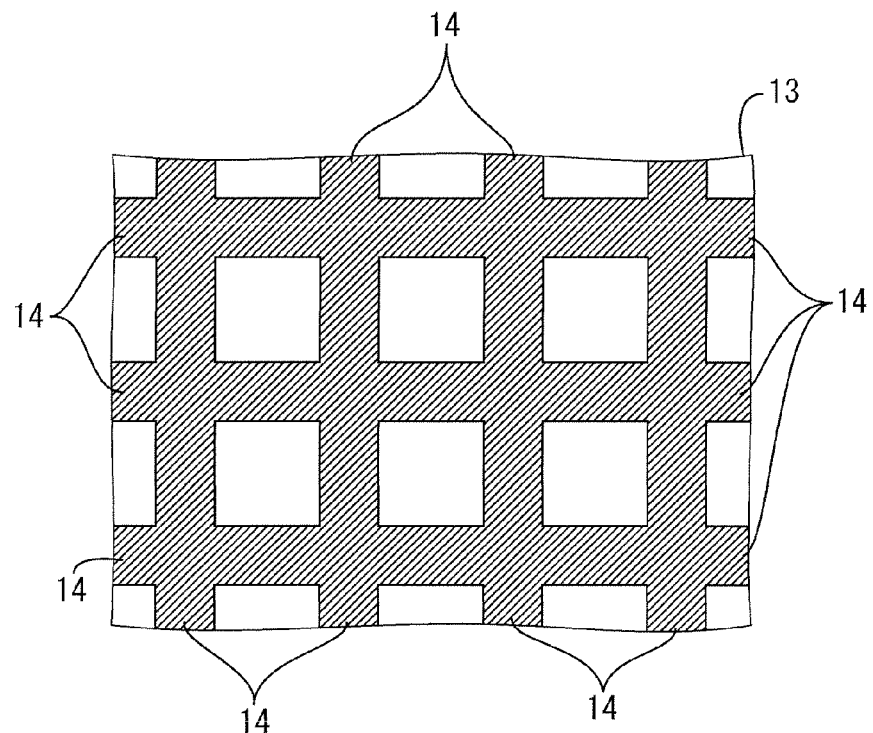
FIG. 6 is a plan view showing a part of a first base member formed with spacers according to a third embodiment with a surface formed with the spacers faced up.

FIG. 6 shows a third embodiment of the invention. The shape of spacers 14 is not limited to the rectangular shapes shown in the first and second embodiments, and may be a lattice or matrix shape, as shown in FIG. 6. The spacers 14 also may have a circular, elliptic or round shape (not shown).

Figure 7:
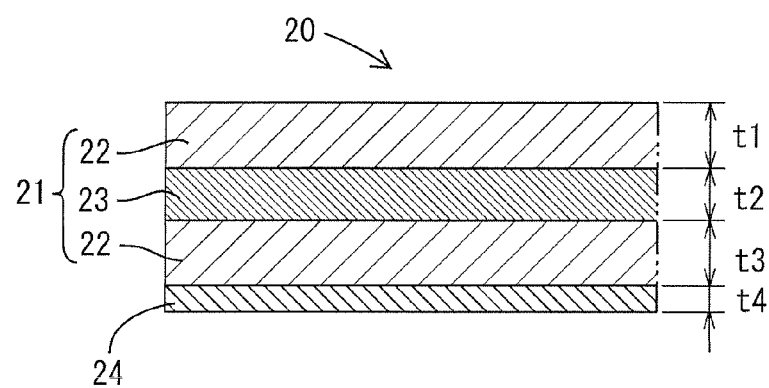
FIG. 7 is a section of a protective tape according to a fourth embodiment.
Figure 8:
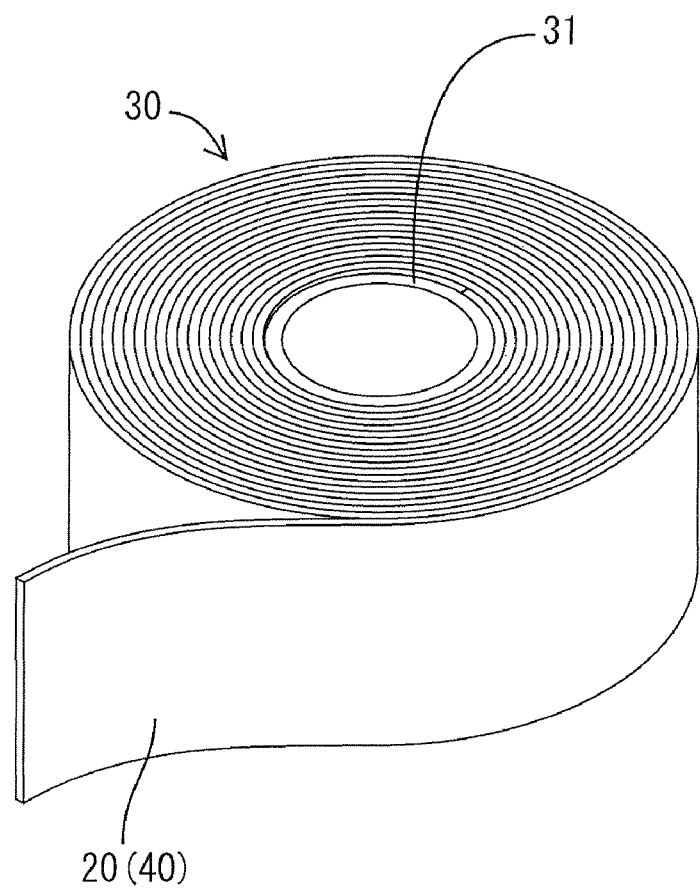
FIG. 8 is a perspective view of a roll of the protective tape.
Figure 9:
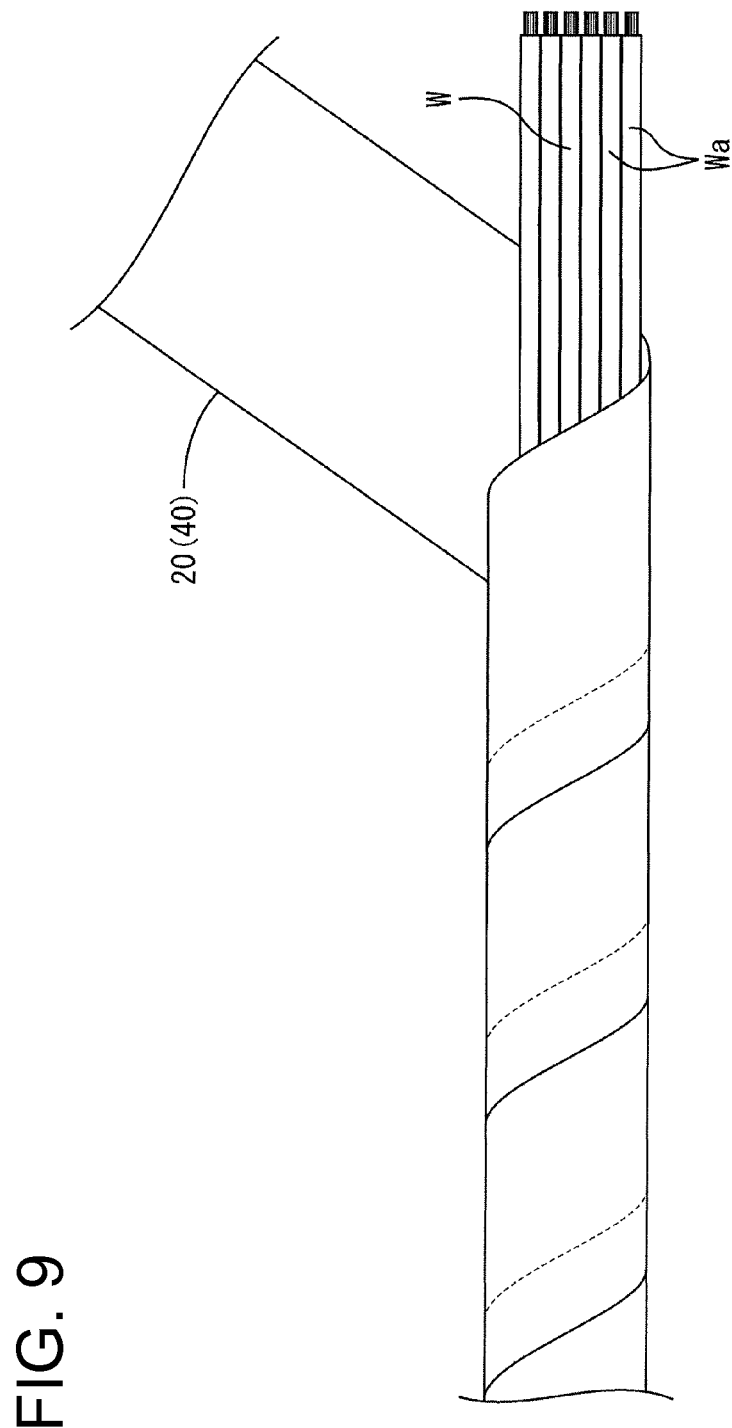
FIG. 9 is a side view showing a wrapping mode of the protective tape around a wire bundle.

A protective member in accordance with a fourth embodiment of the invention is in the form of a tape identified by the numeral 20 in FIGS. 7 to 17 and can be wrapped around a wire bundle W forming a wiring harness. The wire bundle W includes a plurality of insulated wires Wa or shielded wires as shown in FIG. 9.

As shown in FIG. 7, the protective tape 20 includes a base 21 and an adhesive layer 24 on a side of the base 21 that will face radially inwardly and in contact with the outer circumferential surface of the wire bundle W.

The base 21 is a three layer structure with two knitted fabrics 22 bonded by a glue 23. The "knitted fabric" is a fabric where one of a warp and a weft is a substantially continuous loop and the other is inserted through this loop. In contrast, a "woven fabric" has a warp and a weft that vertically intersect.

The glue 23 preferably is a polyamide and is applied in dots between the knitted fabrics 22. The adhesive layer 24 preferably is an acrylic adhesive and/or a rubber adhesive.

The preferred thicknesses of the respective layers are set so that a thickness t1 of the knitted fabric 22 on the outer side and a thickness t3 of the knitted fabric 22 on the underside are less than 1.0 mm, a thickness t2 of the glue 23 is 0.05 to 1.0 mm, a thickness t4 of the adhesive layer 24 is 0.05 to 1.0 mm and the total thickness is less than or equal to 2.0 mm. In this embodiment, the total thickness is about 1.0 mm.

The width of the protective tape 20 preferably is less than or equal to about 100 mm and, for example, is selected to be about 25 mm.

The protective tape 20 is wound around a paper core tube 31 to define a roll 30, as shown in FIG. 8.

The protective tape 20 can be dispensed (e.g. manually) from the roll 30 and wrapped substantially spirally around the outer circumferential surface of the wire bundle W of the wiring harness with the lateral edges of the tape 20 overlapped, as shown in FIG. 9. As a result, the adhesive layer 24 on the underside is bonded to the outer circumferential surface of the wire bundle W. The overlap may be about ¼ of the entire width or about half the entire width.

The protective tape 20 that has been wrapped around a specified region of the wire bundle W needs to be cut or separated. The two knitted fabrics of the base 21 have a good hand cutting property, and hence the protective tape 20 is can be cut or separated easily by hand.

Figure 10:
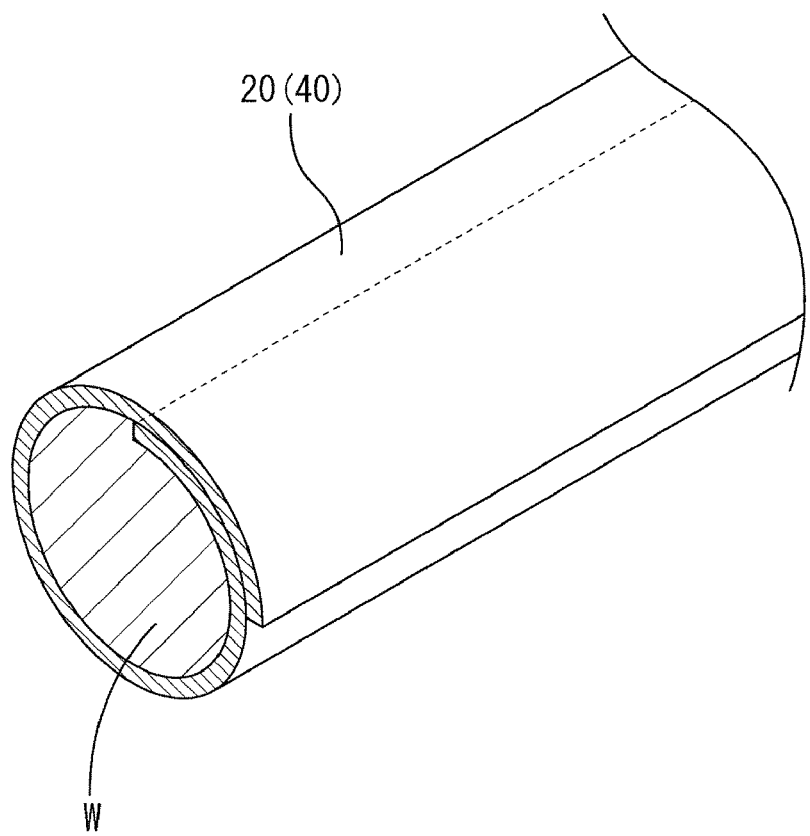
FIG. 10 is a perspective view showing another wrapping mode of the protective tape around the wire bundle.

FIG. 10 shows another form of wrapping the protective tape 20 around the wire bundle W. In this example, the protective tape 20 is wrapped around the outer circumferential surface of the wire bundle W into a substantially cylindrical shape with the opposite lateral edges overlapped. More specifically, the protective tape 20 is brought into contact with the wire bundle W substantially in the longitudinal direction of the wire bundle W while being dispensed from the roll 30 (see FIG. 8), and is cut or separated by hand after being brought substantially into contact over a specified region. Thereafter, the protective tape 20 is rolled with the opposite lateral edges overlapped preferably by about ¼ of the entire width, and the adhesive layer 24 on the underside is bonded to the outer circumferential surface of the wire bundle W.

Figure 11:
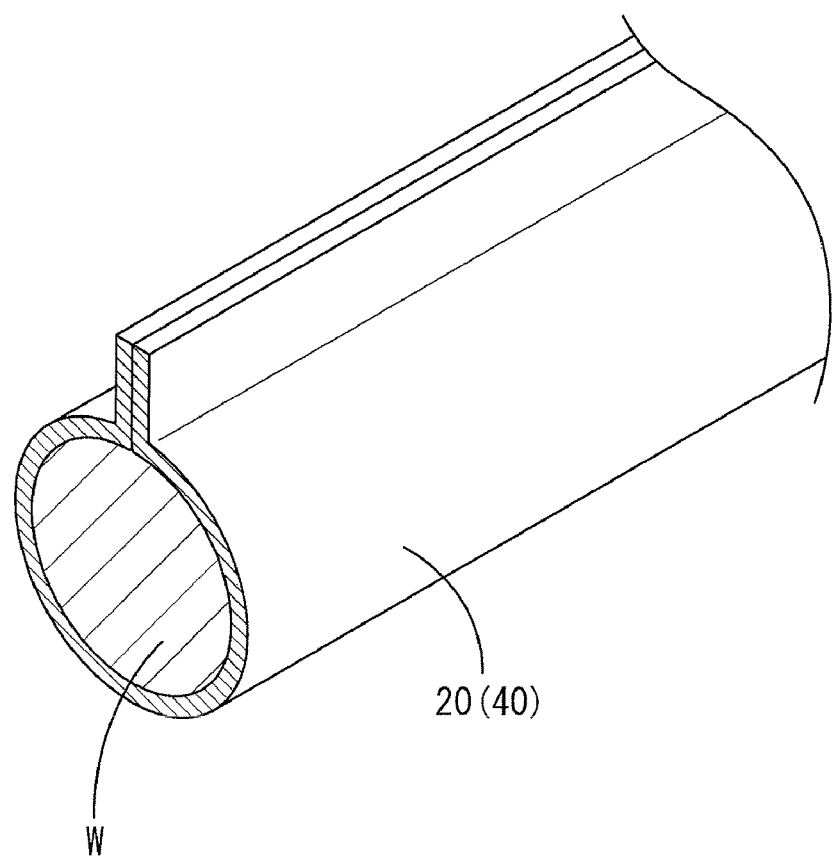
FIG. 11 is a perspective view showing still another wrapping mode of the protective tape around the wire bundle.

Another wrapping mode is shown in FIG. 11. In this example, the protective tape 20 is wrapped around the outer circumferential surface of the wire bundle W into a substantially cylindrical shape with the inner surfaces of the opposite lateral edges bonded together. More specifically, the protective tape 20 is dispensed from the roll 30 substantially in the longitudinal direction of the wire bundle W, is brought into contact with a specified region of the wire bundle W and then is cut or separated by hand. The protective tape 20 then is wrapped with the inner surfaces of the substantially opposite lateral edges bonded together and with the adhesive layer 24 on the underside bonded to the outer circumferential surface of the wire bundle W. A dimension of the opposite lateral edges bonded together is, for example, about ¼ of the entire width of the protective tape 20.

Evaluation as to whether the protective tape 20 wrapped as described above is effective as a protective member for the wire bundle W requires evaluation of the abrasion resistance of the first protective tape 20. Here, if it is assumed that a hole is made in the protective tape 20 to an extent that the wire bundle W is exposed to the outside when the protective tape 20 is subjected to an external load, the protective tape 20 of this embodiment can be said to have good abrasion resistance.

A load applied to the protective tape 20 is distributed mainly in the two knitted fabrics 22 and hence a stress is relaxed. Thus, the protective tape 20 is considered to be difficult to abrade. Further, the glue 23 is applied in dots to form clearances between the two knitted fabrics 22. As a result, a load distribution function of the knitted fabrics 22 is improved.

Figures 12, 13:
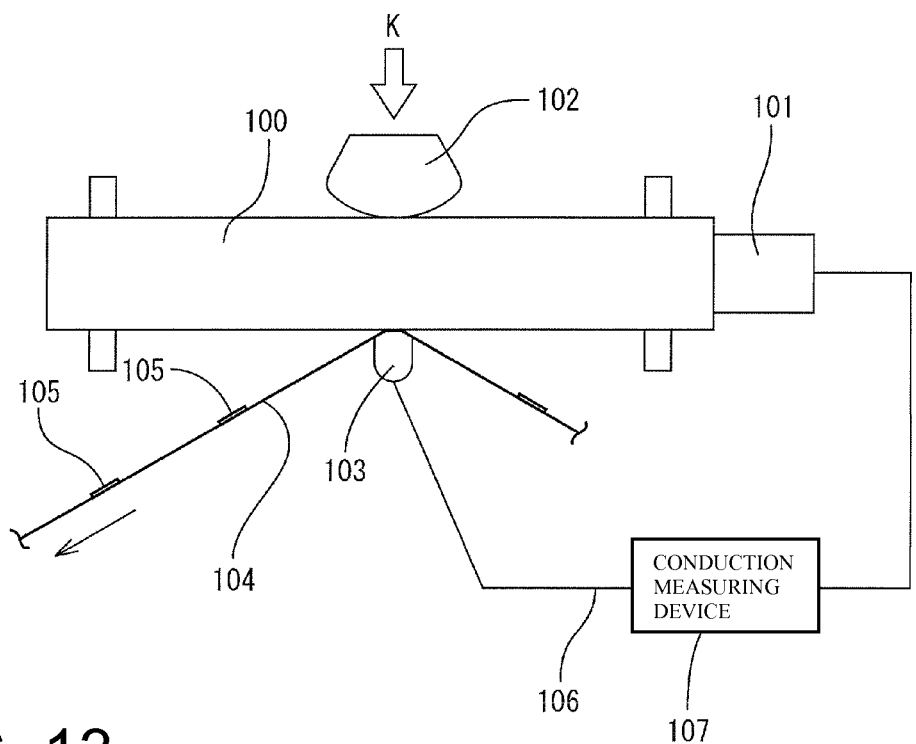
FIG. 12 is a schematic diagram of an abrasion resistance tester.
FIG. 13 is a graph showing a test result.

An abrasion resistance tester (for automotive low-pressure wires) specified by the JIS was used, as shown in FIG. 12, to test the abrasion resistance of the protective tape 20. In this tester, a sample 100 was wrapped around the outer circumferential surface of a conductor 101 made of an aluminum tube and held between upper and lower metallic holding bodies 102, 103. An endless abrasive tape (article in compliance with JIS R6251) was arranged between the lower holding body 103 and the sample 100 so as to be able to run. Conductive portions 105 were provided at specified intervals (150 mm) on the abrasive tape 104, and the lower holding body 103 and the conductor 101 were connected by a conductive wire 106 with a conduction measuring device 107 provided at an intermediate position.

The abrasive tape 104 was caused to run at a specified speed (1500 mm/min) with a load K (45 gf) exerted on the upper holding body 102. The sample 100 was abraded gradually and consequently a hole was made therein as the abrasive tape 104 ran. One conductive portion 105 of the abrasive tape 104 contacted the conductor 101 through the hole. Thus, a current flow in the conductive wire 106 and the abrasive tape 104 stopped when the current was detected by the conduction measuring device 107.

The abrasive tape 104 stops running when a hole is made in the sample 100. Thus, a longer running time of the abrasive tape 104 indicates that a hole in the sample 100 is more difficult to make and abrasion resistance can be evaluated.

A test of the protective tape 20 indicates that the running distance of the abrasive tape 104, as an indication of abrasion resistance, was 100 to 200 mm, as shown in FIG. 13.

A PP (polypropylene) film having a thickness of 0.3 mm was subjected to the same test to determine the abrasion resistance of a conventional flame resistant corrugated tube. The numerical values relating to the abrasion resistance were confirmed to be 100 to 200 mm in this test. Thus, the protective tape 20 had good abrasion resistance similar to abrasion resistance of corrugated tubes that have proven to be good protective members for wiring harnesses.

The protective tape 20 of this embodiment has the two knitted fabrics 22 bonded by the glue 23 applied in dots to form the clearances between the two fabrics 22. Thus, sound deadening qualities also are good.

Sound deadening properties were assessed by a test relating to hammering sounds and a test relating to friction sounds.

Figure 14:
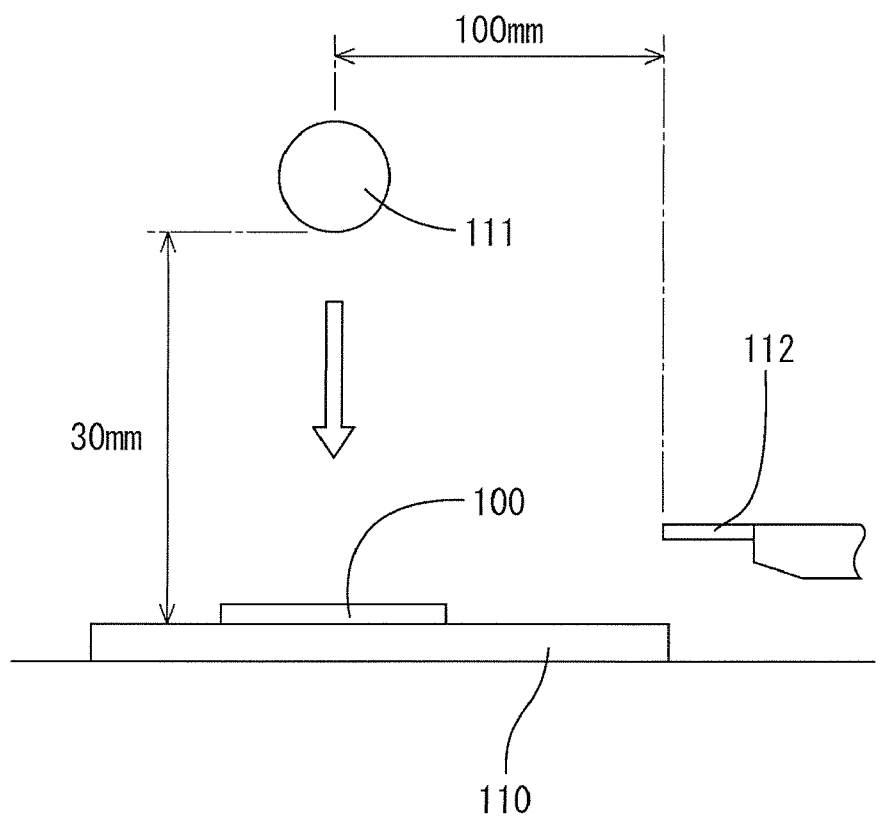
FIG. 14 is a schematic diagram of a sound deadening tester relating to hammering sounds.

The test relating to hammering sounds was carried out, as shown in FIG. 14, by placing a sample 100 on a 2 mm thick test plate 110 made of a stainless steel. The test plate 110 also could be polypropylene (PP) or polyethylene (PE). An iron ball 111 of 100 g then was dropped freely onto the sample 100 from a height of 30 mm, and hammering sounds generated at that time were measured by a measuring device 112 slightly above the test plate 110 and at a horizontal distance of 100 mm from the dropped position of the iron ball 111.

Figure 15:
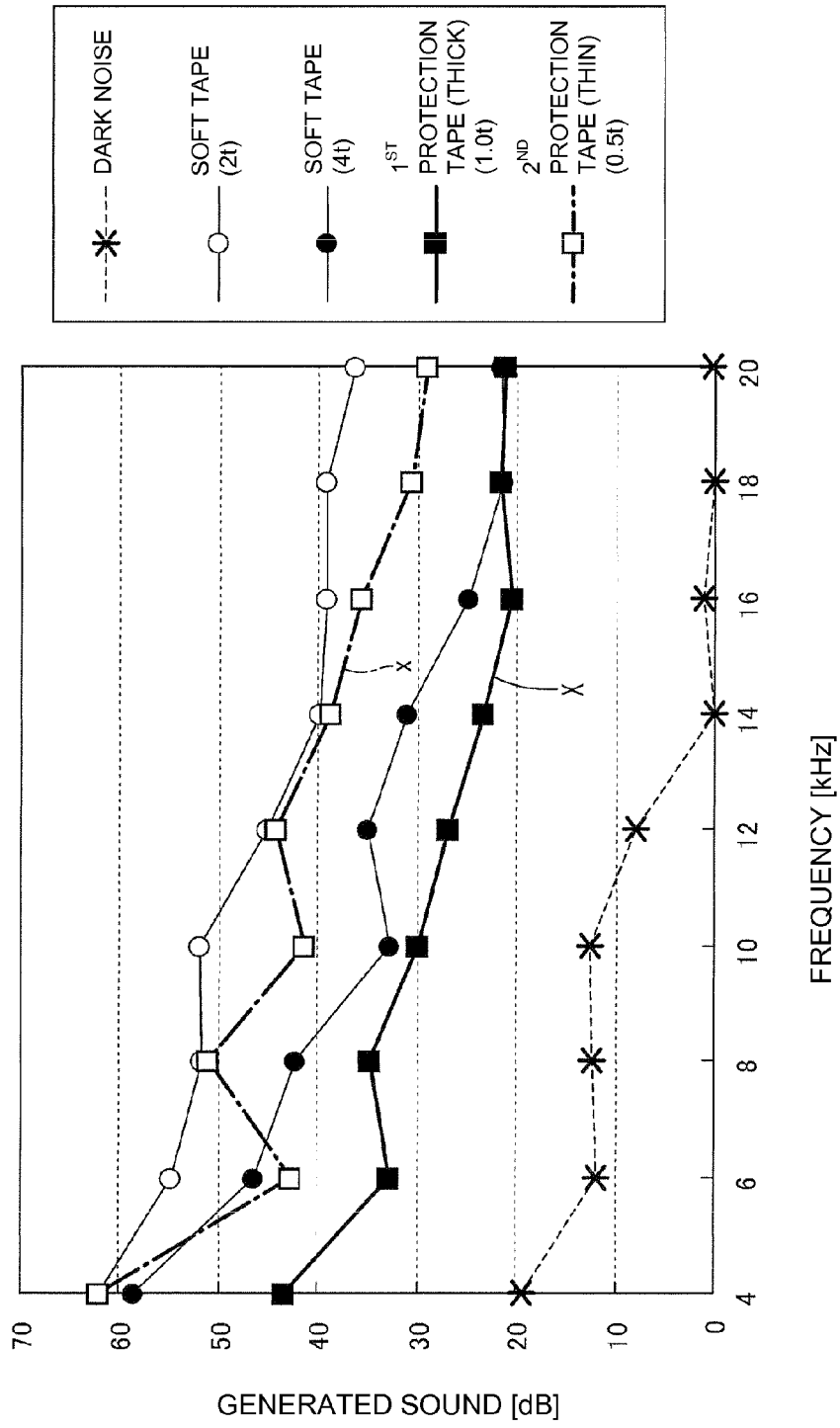
FIG. 15 is a graph showing a test result.

The result of testing the first protective tape 20 of this embodiment is shown by a characteristic curve X of a graph of FIG. 15. Hammering sounds are equal to or below 40 dB in an audible area (about 6 to 20 kHz). This test indicates sound deadening qualities or absorption properties comparable to or higher than those of a soft tape (urethane foam tape) having a thickness of 4 mm, which is proven to have good sound deadening or absorption qualities against hammering.

Figure 16:
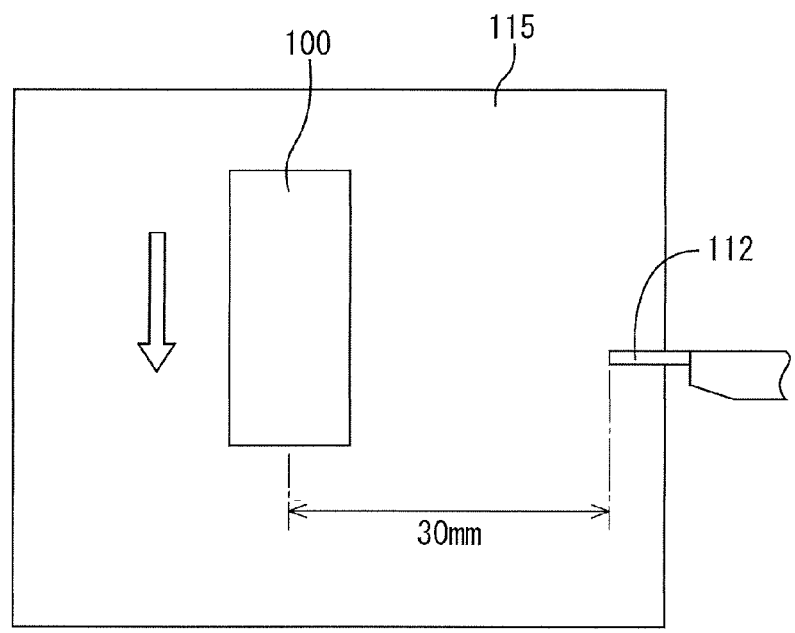
FIG. 16 is a schematic diagram of a sound deadening tester relating to friction sounds.

The test relating to friction sounds was carried out, as shown in FIG. 16, by manually sliding a sample 100 at a speed of about 20 mm/sec in a direction of an arrow from a specified position on a test plate 115 made of a 2 mm thick stainless steel plate. The test plate 115 also could be polypropylene (PP) or polyethylene (PE). Friction sounds were measured by a measuring device 112 arranged slightly above the test plate 115 and at a horizontal distance of 30 mm from the sliding position of the sample 100.

Figure 17:
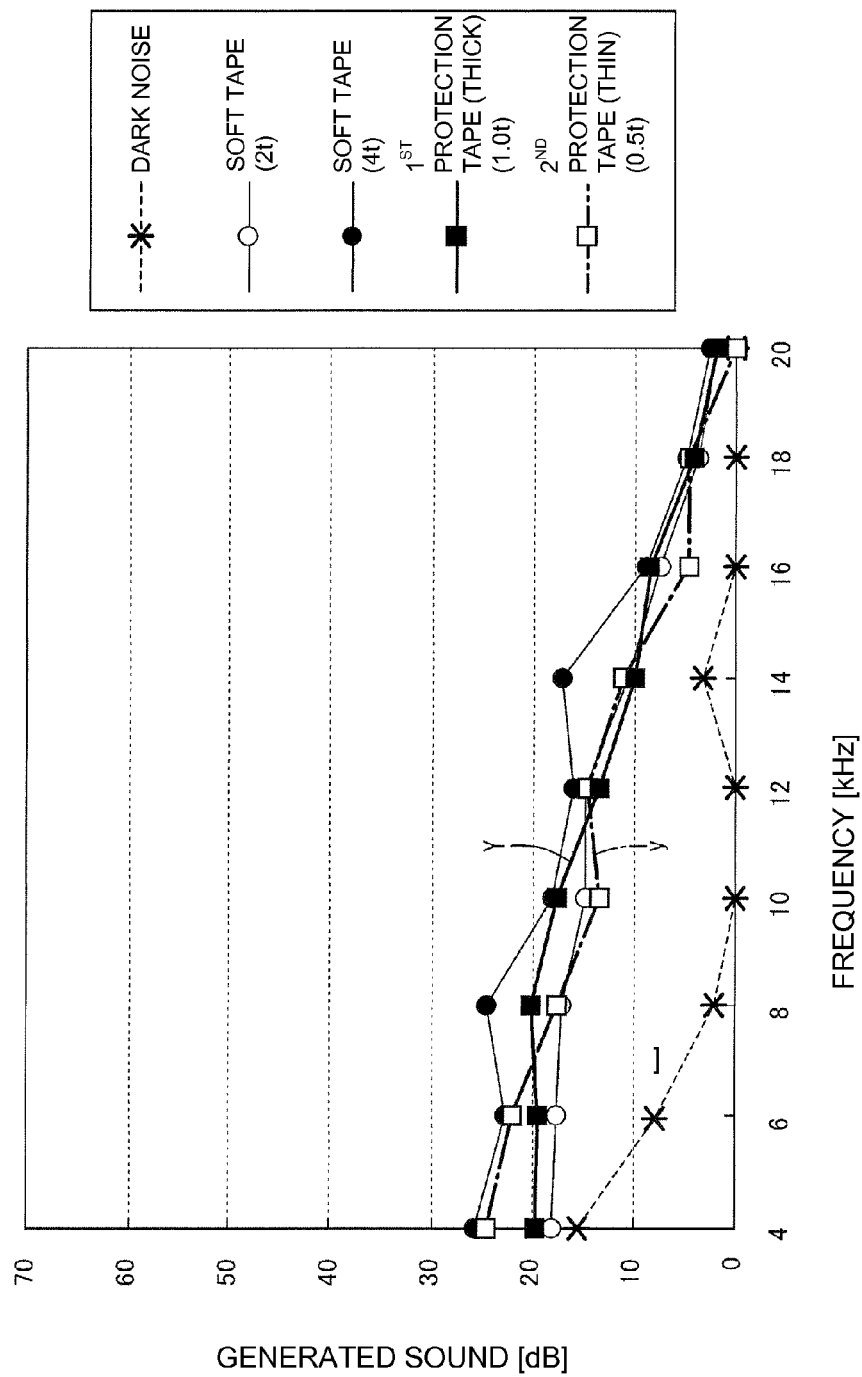
FIG. 17 is a graph showing a test result.

The result of testing the protective tape 20 is shown by a curve Y of a graph of FIG. 17. Friction sounds are equal to or below 20 dB in the audible area (6 to 20 kHz). This test indicates sound deadening or absorption properties comparable to or higher than those of soft tapes (urethane foam tapes) having a thickness of 2 mm and 4 mm, which are proven to have good sound deadening qualities against friction sounds.

These two tests indicate that the protective tape 20 has good sound deadening qualities against both hammering sounds and friction sounds.

The base 21 of the protective tape 20 has the above-described three-layer structure and the glue 23 is applied in dots to form clearances between the two knitted fabrics 22. Thus, the protective tape 20 also has good flexibility and can be wrapped closely around the outer circumferential surface of the wire bundle W even if the outer circumferential surface of the wire bundle W is uneven or the wire bundle W is bent.

The protective tape 20 achieves the following advantages when used as the protective member for the wire bundle B of wiring harness.

The protective tape 20 has abrasion resistance comparable to corrugated tubes, which are proven to be good protective members for the wire bundle W. Thus, the protective tape 20 can protect the wire bundle W.

The protective tape 20 can be mounted merely by being dispensed from the roll 30, wrapped around the outer circumferential surface of the wire bundle W, and cut or separated easily by hand due to its good hand cutting property. Therefore the protective tape 20 can be mounted efficiently.

The operation time can be shortened and the number of parts can be reduced for drastically reducing production cost of the wiring harness.

The protective tape 20 having a thickness of about 1.0 mm merely is wrapped. Thus, an increase of the diameter of the wiring harness is suppressed to a minimum level, which contributes to space weight saving.

The protective tape 20 has good sound deadening qualities. Thus, the generation of noise is suppressed when the wiring harness contacts with or abrades against surrounding members due to vibration or the like.

The protective tape 20 also has good flexibility and can be wrapped closely around the outer circumferential surface of the wire bundle W even if the outer circumferential surface of the wire bundle W is uneven or the wire bundle W is bent.

Figure 18:
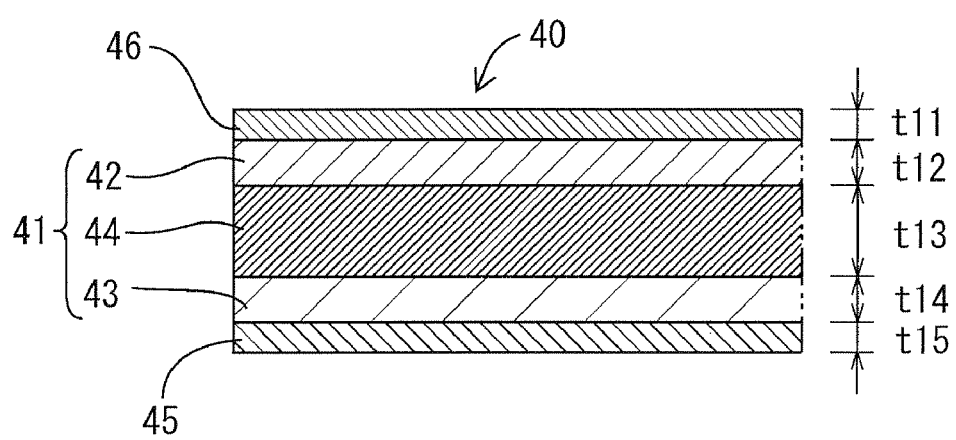
FIG. 18 is a section of a protective tape according to a fifth embodiment.

A fifth embodiment of the invention is described with reference to FIG. 18. This embodiment shows another example of a protective tape to be wrapped around a wire bundle W e.g. forming a wiring harness. Elements common to the fourth embodiment are not described again.

The fifth embodiment has a protective tape 40 that is thinner than the protective tape 20 of the fourth embodiment. As shown in FIG. 18, the protective tape 40 has a base 41, an adhesive layer 45 formed on the underside of the base 41 to be held in contact with the outer circumferential surface of the wire bundle W and a release film 46 formed on the outer surface of the base 41 (radially inner side when mounted).

The base 41 has a three-layer structure by bonding a woven fabric 42 and a nonwoven fabric 43 using a rubber adhesive 44.

The adhesive layer 45 preferably is an acrylic adhesive or a rubber adhesive and the release film 46 preferably is a polyethylene film.

The preferred thicknesses of the respective layers are set so that the release film 46, as the outermost layer, has a thickness t11 less than 0.05 mm, the woven fabric 42 on the outer side of the base 41 has a thickness t12 less than 0.2 mm, the rubber adhesive 44, as an intermediate layer, has a thickness t13 of 0.05 to 0.1 mm, the nonwoven fabric 43 on the underside has a thickness t14 less than 0.2 mm, the adhesive layer 45 on the underside has a thickness t15 of 0.05 to 1.0 mm and the total thickness is set equal to or less than 1.0 mm. In this embodiment, the total thickness is 0.5 mm (thin specification).

The width of the protective tape 40 preferably is equal to or smaller than about 100 mm and preferably is 25 mm.

The protective tape 40 is prepared as a roll 30 wound around a paper core tube 31, as shown in FIG. 8.

The outer layer of the base 41 of the protective tape 40 is formed by the woven fabric 42. If the protective tape 40 is wound into the roll 30, as described above, with the woven fabric 42 exposed, the adhesive may possibly remain on the rear surface of the protective tape 40 or fibers of the woven fabric 42 may possibly be pulled as the protective tape 40 is dispensed. However, the release film 46 is arranged on the outer surface of the base 41. Thus, the adhesive is separated reliably from the rear surface of the protective tape 40 and the fibers of the woven fabric 42 are not pulled when the protective tape 40 is dispensed.

The protective tape 40 is wrapped manually around the wire bundle W. Similar to the fourth embodiment, the protective tape 40 may be wrapped with the opposite lateral edges overlapped, as shown in FIG. 9, or may be wrapped into a cylindrical shape with the opposite lateral edges overlapped, as shown in FIG. 10, or may be wrapped into a cylindrical form with the inner surfaces of the opposite lateral edges bonded together, as shown in FIG. 11.

Evaluation as to whether the protective tape 40 wrapped as described above is effective as a protective member for the wire bundle W requires evaluation of the abrasion resistance of the protective tape 40. The second protective tape 40 can be said to similarly have good abrasion resistance.

The protective tape 40 is thought to be difficult to abrade because the relatively thick layer of the rubber adhesive 44 bonds the woven fabric 42 and the nonwoven fabric 43 and is thought to relax a stress when the protective tape 40 is subjected to an external load.

A test relating to the abrasion resistance of the protective tape 40 was conducted using the abrasion resistance tester of FIG. 12. The running distance of the abrasive tape 104 indicating the abrasion resistance was confirmed to have reached 100 to 200 mm as shown in FIG. 13. Thus, the protective tape 40 has good abrasion resistance comparable to abrasion resistance of corrugated tubes, which have proven to be good protective members for wiring harnesses.

The base 41 of the protective tape 40 has the relatively thick layer of the rubber adhesive 44 bonding the woven fabric 42 and the nonwoven fabric 42. The relatively thick intermediate layer of the rubber adhesive 44 is thought to have good sound deadening qualities.

To evaluate the sound deadening qualities, tests were conducted relating to hammering sounds, as shown in FIG. 14, and friction sounds, as shown in FIG. 16.

The result of the test relating to hammering sounds is shown by a characteristic curve x of the graph of FIG. 15. Hammering sounds are equal to or below 50 dB in the audible area (about 6 to 20 kHz). This indicates sound deadening qualities comparable to or higher than those of a soft tape (urethane foam tape) having a thickness of 2 mm, which is proven to have good sound deadening qualities against hammering sounds.

The result of the test relating to friction sounds is shown by a characteristic curve y of the graph of FIG. 17. Friction sounds are equal to or below 20 dB in the audible area (about 6 to 20 kHz). This indicates sound deadening qualities comparable to or higher than those of soft tapes (urethane foam tapes) having a thickness of 2 mm and a thickness of 4 mm, which is proven to have good sound deadening qualities against friction sounds.

These tests confirm that the protective tape 40 has good sound deadening qualities against both hammering sounds and friction sounds.

The base 41 of the protective tape 40 has the three-layer structure with the relatively thick intermediate layer of the rubber adhesive 44. Thus, the protective tape 40 has good flexibility and can be wrapped closely around the outer circumferential surface of the wire bundle W even if the outer circumferential surface of the wire bundle W is uneven or the wire bundle W is bent.

The protective tape 40 used as the protective member for the wire bundle B of the wiring harness has the advantages described above with respect to the fourth embodiment.

More particularly, the protective tape 40 has abrasion resistance comparable to corrugated tubes, which are proven to be good protective members for the wire bundle W. Thus, the protective tape 40 sufficiently fulfills its function of protecting the wire bundle W. The protective tape 40 can be mounted merely by being dispensed from the roll 30, wrapped around the outer circumferential surface of the wire bundle W and can be hand-cut easily due to its good hand cutting property. Therefore, the protective tape 40 can be mounted efficiently.

The operation time can be shortened and the number of parts can be reduced, so that production cost can be reduced drastically.

The protective tape 40 has a thickness of only about 0.5 mm and merely is wrapped. Thus, an increase of the diameter of the wiring harness is suppressed to a minimum, which contributes to space and weight saving. Further, the second protective tape 40 has good sound deadening qualities to suppress the generation of noise when the wiring harness contacts or abrades against surrounding members due to vibration or the like. Furthermore, since the second protective tape 40 also has good flexibility, and can be wrapped closely around the outer circumferential surface of the wire bundle W even if the outer circumferential surface of the wire bundle W is uneven or the wire bundle W is bent.

The invention is not limited to the above described and illustrated embodiments. For example, the following embodiments are also included in the technical scope of the present invention.

The spacers are formed by applying the adhesive substantially in rectangles (or other shapes) on the lower surface of the first base in the first and second embodiments. However, the spacers may be formed by applying a hot melt glue or bonding another sheet of a desired shape to the first base.

The spacers have a substantially rectangular shape of 10 mm to 20 mm×10 mm to 20 mm, the interval between the adjacent spacers is about 2 mm to 5 mm and the thickness of the spacers is equal to or larger than 0.1 mm and equal to or smaller than 0.5 mm in the first and second embodiments. However, the size and the interval of the spacers are not limited to these. The adjacent spacers may be spaced apart to such an extent as not to join together.

The protective member is made easily cut or separated by hand by being formed with the perforations and setting the sum of the thickness of the first and second bases as substantially equal to or less than 1.0 mm in the first embodiment. However, the sum of the thickness of the first and second bases may be substantially equal to or smaller than 1.0 mm without forming any perforation, or perforations may be formed while setting the sum of the thickness of the first and second bases larger than 1.0 mm. Further, the protective member may be made hand-cut by adjusting the rupture strength of the protective member itself, for example, by adjusting the materials of the base and the adhesive layer.

The sum of the thickness of the first and second bases is equal to or smaller than 0.5 mm since the protective member can be more easily hand-cut.

The perforations are formed after one sheet is formed by placing the first adhesive layer, the first base, the layer with the spacers and the second base one over another in the above first embodiment. However, these layers may be laminated after perforations are formed at least in one of the first and second bases.

The wire protective member is shown covering one wire in the first and second embodiments. However, the wire protective member may cover two or more wires together.

The two fabrics of the base of the protective tape of the fourth embodiment are both knitted fabrics. However, a knitted fabric and a woven fabric may be combined or both may be woven fabrics.

In the above fourth embodiment, if the glue for bonding the two fabric materials has a relative low hardness, it may be applied over the entire surface.

An adhesive may be used instead of the glue to bond the two fabric materials. An acrylic adhesive or a rubber adhesive preferably is used.

In the fifth embodiment, a knitted fabric may be used as the fabric material of the base of the protective tape instead of the woven fabric.

In the fifth embodiment, a resin film, a woven fabric, a knitted fabric or a foam may be used as the sheet material of the base of the protective tape in addition to the nonwoven fabric.

In the fifth embodiment, the fabric material and the sheet material of the base of the protective tape may be arranged on the opposite sides.

The release film may not be provided in the fifth embodiment, if the outer layer of the base of the protective tape is formed by a material that has a small possibility that an adhesive remains or fibers are pulled when being in the form of a roll.

What is claimed is:

1. A wire protective member for at least partly covering a wire from an outer side, comprising:
an elongate first base having a length and a width and including opposite first and second surfaces;
a first adhesive layer on the first surface of the first base to be bonded to the wire;
a plurality of adhesive spacers applied at spaced apart positions on the second surface of the first base so that each of the spacers has at least one adjacent spacer, the spacers being disposed so that intervals between the spacers are aligned in at least one direction parallel to the length or the width of the first base so that continuous linear strips uninterrupted by the adhesive spacers extend in the at least one direction parallel to the length or the width of the first base;
a second base formed from a woven or non-woven fabric and secured on the spacers so that the intervals between the spacers also define continuous uninterrupted linear clearances between the first and second bases extending in the at least one direction parallel to the length or the width;
perforation arrays formed through the first and second bases so that all of the perforation arrays in the first base align with the perforation arrays in the second base and so that each of the perforation arrays registers with at least a corresponding one of the aligned intervals between the spacers to define linear areas where the protective member can be cut, the perforations in the second base defining visual indications of where the protective member can be cut.

2. The wire protective member of claim 1, wherein a sum of thicknesses of the first and second bases is substantially equal to or less than 1.0 mm.

3. The wire protective member of claim 1, wherein the wire protective member is a substantially rectangular sheet with first and second pairs of opposite sides, the first sides having a length related to a length of the wire and the second sides having a length related to an outer circumference of the wire.

4. The wire protective member of claim 1, wherein the first base is a resin sheet, a metal foil or a paper.

5. The wire protective member of claim 1, wherein the perforations extend substantially parallel to the length of the first base.

6. The wire protective member of claim 1, wherein the dimensions of each of the spacers in directions parallel to the second surface are at least twice as great as the dimensions between adjacent spacers.

7. The wire protective member of claim 1, wherein the perforations extend substantially perpendicular to the length of the first base.

8. The wire protective member of claim 1, wherein the perforations comprise a first array or perforations extending substantially perpendicular to the length of the first base and second array or perforations extending substantially parallel to the length of the first base.

\* \* \* \* \*